US008433157B2

(12) United States Patent
Nijim et al.

(10) Patent No.: US 8,433,157 B2
(45) Date of Patent: Apr. 30, 2013

(54) SYSTEM AND METHOD FOR THREE-DIMENSIONAL OBJECT RECONSTRUCTION FROM TWO-DIMENSIONAL IMAGES

(75) Inventors: Yousef Wasef Nijim, Roswell, GA (US); Izzat Hekmat Izzat, Santa Clara, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 863 days.

(21) Appl. No.: 12/226,847

(22) PCT Filed: Oct. 25, 2006

(86) PCT No.: PCT/US2006/041647
§ 371 (c)(1),
(2), (4) Date: Jun. 30, 2009

(87) PCT Pub. No.: WO2007/130122
PCT Pub. Date: Nov. 15, 2007

(65) Prior Publication Data
US 2009/0296984 A1 Dec. 3, 2009

Related U.S. Application Data

(60) Provisional application No. 60/798,087, filed on May 5, 2006.

(51) Int. Cl.
*G06K 9/32* (2006.01)
(52) U.S. Cl.
USPC ........... 382/285; 382/103; 382/154; 382/275; 382/282; 358/3.26; 358/3.27; 358/463
(58) Field of Classification Search .................. 382/103, 382/154, 190, 282, 284, 285, 275; 358/537, 358/538, 540, 3.26, 3.27, 463
See application file for complete search history.

(56) References Cited

U.S. PATENT DOCUMENTS 6,072,903 A   6/2000 Maki et al.
6,919,892 B1 * 7/2005 Cheiky et al. ................. 345/473
(Continued)

FOREIGN PATENT DOCUMENTS

| JP | 1040385 | 2/1998 |
| JP | 10-320588 | 12/1998 |
| JP | 2003-242162 | 8/2003 |

OTHER PUBLICATIONS

Jiang Yu Zheng: "Constructing a 3D Object Model From Multiple Visual Features" Systems, Man and Cybernetics, 1996 IEE International Conference on Beijing, China Oct. 14-17, 1996, New York, NY, USA IEEE, US, vol. 4, Oct. 14, 1996, pp. 2457-2462, XP010206502.

(Continued)

*Primary Examiner* — Yosef Kassa
(74) *Attorney, Agent, or Firm* — Robert D. Shedd; Vincent E. Duffy; James McKenzie

(57) ABSTRACT

A system and method for three-dimensional (3D) acquisition and modeling of a scene using two-dimensional (2D) images are provided. The system and method provides for acquiring first and second images of a scene, applying a smoothing function to the first image to make feature points of objects, e.g., corners and edges of the objects, in the scene more visible, applying at least two feature detection functions to the first image to detect feature points of objects in the first image, combining outputs of the at least two feature detection functions to select object feature points to be tracked, applying a smoothing function to the second image, applying a tracking function on the second image to track the selected object feature points, and reconstructing a three-dimensional model of the scene from an output of the tracking function.

21 Claims, 3 Drawing Sheets

U.S. PATENT DOCUMENTS

| | | | |
|---|---|---|---|
| 6,993,157 B1 * | 1/2006 | Oue et al. | 382/103 |
| 7,027,054 B1 * | 4/2006 | Cheiky et al. | 345/473 |
| 7,626,569 B2 * | 12/2009 | Lanier | 345/156 |
| 7,643,025 B2 * | 1/2010 | Lange | 345/419 |
| 7,986,825 B2 * | 7/2011 | Kochi et al. | 382/154 |
| 8,023,726 B2 * | 9/2011 | Sundaresan et al. | 382/154 |
| 8,077,914 B1 * | 12/2011 | Kaplan | 382/103 |
| 8,081,798 B2 * | 12/2011 | Paglieroni et al. | 382/103 |

OTHER PUBLICATIONS

Search Report Dated Feb. 21, 2008.

* cited by examiner

SYSTEM AND METHOD FOR THREE-DIMENSIONAL OBJECT RECONSTRUCTION FROM TWO-DIMENSIONAL IMAGES

This application claims the benefit under 35 U.S.C. §365 of International Application PCT/US2006/041647, filed Oct. 25, 2006, which was published in accordance with PCT article 21(2) on Apr. 17, 2008, in English and which claims the benefit under 35 U.S.C. §119 of a provisional application 60/798,087 filed in the United States on May 5, 2006.

TECHNICAL FIELD OF THE INVENTION

The present invention generally relates to three-dimensional object modeling, and more particularly, to a system and method for three-dimensional (3D) information acquisition from two-dimensional (2D) images using hybrid feature detection and tracking including smoothing functions.

BACKGROUND OF THE INVENTION

When a scene is filmed, the resulting video sequence contains implicit information on the three-dimensional (3D) geometry of the scene. While for adequate human perception this implicit information suffices, for many applications the exact geometry of the 3D scene is required. One category of these applications is when sophisticated data processing techniques are used, for instance in the generation of new views of the scene, or in the reconstruction of the 3D geometry for industrial inspection applications.

Recovering 3D information has been an active research area for some time. There are a large number of techniques in the literature that either captures 3D information directly, for example, using a laser range finder or recover 3D information from one or multiple two-dimensional (2D) images such as stereo or structure from motion techniques. 3D acquisition techniques in general can be classified as active and passive approaches, single view and multi-view approaches and geometric and photometric methods.

Passive approaches acquire 3D geometry from images or videos taken under regular lighting conditions. 3D geometry is computed using the geometric or photometric features extracted from images and videos. Active approaches use special light sources, such as laser, structure light or infrared light. Active approaches compute the geometry based on the response of the objects and scenes to the special light projected onto the surface of the objects and scenes.

Single-view approaches recover 3D geometry using multiple images taken from a single camera viewpoint. Examples include structure from motion and depth from defocus.

Multi-view approaches recover 3D geometry from multiple images taken from multiple camera viewpoints, resulted from object motion, or with different light source positions. Stereo matching is an example of multi-view 3D recovery by matching the pixels in the left image and right image in the stereo pair to obtain the depth information of the pixels.

Geometric methods recover 3D geometry by detecting geometric features such as corners, edges, lines or contours in single or multiple images. The spatial relationship among the extracted corners, edges, lines or contours can be used to infer the 3D coordinates of the pixels in images. Structure From Motion (SFM) is a technique that attempts to reconstruct the 3D structure of a scene from a sequence of images taken from a camera moving within the scene or a static camera and a moving object. Although many agree that SFM is fundamentally a nonlinear problem, several attempts at representing it linearly have been made that provide mathematical elegance as well as direct solution methods. On the other hand, non-linear techniques require iterative optimization, and must contend with local minima. However, these techniques promise good numerical accuracy and flexibility. The advantage of SFM over the stereo matching is that one camera is needed. Feature based approaches can be made more effective by tracking techniques, which exploits the past history of the features' motion to predict disparities in the next frame. Second, due to small spatial and temporal differences between 2 consecutive frames, the correspondence problem can be also cast as a problem of estimating the apparent motion of the image brightness pattern, called the optical flow. There are several algorithms that use SFM; most of them are based on the reconstruction of 3D geometry from 2D images. Some assume known correspondence values, and others use statistical approaches to reconstruct without correspondence.

The above-described methods have been extensively studied for decades. However, no single technique performs well in all situations and most of the past methods focus on 3D reconstruction under laboratory conditions, which are relatively easy. For real-world scenes, subjects could be in movement, lighting may be complicated, and depth range could be large. It is difficult for the above-identified techniques to handle these real-world conditions.

SUMMARY

The present disclosure provides a system and method for three-dimensional (3D) acquisition and modeling of a scene using two-dimensional (2D) images. The system and method of the present disclosure includes acquiring at least two images of a scene and applying a smoothing function to make the features more visible followed by a hybrid scheme of feature selection and tracking for the recovery of 3D information. Initially, the smoothing function is applied on the images followed by a feature point selection that will find the features in the image. At least two feature point detection functions are employed to cover a wider range of good feature points in the first image, then the smoothing function is applied on the second image followed by a tracking function to track the detected feature points in the second image. The results of the feature detection/selection and tracking will be combined to obtain a complete 3D model. One target application of this work is 3D reconstruction of film sets. The resulting 3D models can be used for visualization during the film shooting or for postproduction. Other applications will benefit from this approach including but not limited to gaming and 3D TV.

According to one aspect of the present disclosure, a three-dimensional acquisition process is provided including acquiring first and second images of a scene, applying at least two feature detection functions to the first image to detect feature points of objects in the image, combining outputs of the at least two feature detection functions to select object feature points to be tracked, applying a tracking function on the second image to track the selected object feature points, and reconstructing a three-dimensional model of the scene from the output of the tracking function. The process further applying a smoothing function on the first image before the applying of at least two feature detection functions step to make the feature points of objects in the first image more visible, wherein the features points are corners, edges or lines of objects in the image.

In another aspect of the present disclosure, a system for three-dimensional (3D) information acquisition from two-dimensional (2D) images is provided. The system includes a post-processing device configured for reconstructing a three-dimensional model of a scene from at least two images, the post-processing device including a feature point detector configured to detect feature points in an image, the feature point detector including at least two feature detection functions, wherein at least two feature detection functions are applied to a first image of the at least two images, a feature point tracker configured for tracking selected feature points between at least two images, and a depth map generator configured to generate a depth map between the at least two images from the tracked feature points, wherein the post-processing device creates the 3D model from the depth map. The post-processing device further includes a smoothing function filter configured for making feature points of objects in the first image more visible.

In a further aspect of the present disclosure, a program storage device readable by a machine, tangibly embodying a program of instructions executable by the machine to perform method steps for modeling a three-dimensional (3D) scene from two-dimensional (2D) images is provided, the method including acquiring first and second images of a scene, applying a smoothing function to the first image, applying at least two feature detection functions to the smoothed first image to detect feature points of objects in the image, combining outputs of the at least two feature detection functions to select object feature points to be tracked, applying the smoothing function on the second image, applying a tracking function on the second image to track the selected object feature points, and reconstructing a three-dimensional model of the scene from an output of the tracking function.

BRIEF DESCRIPTION OF THE DRAWINGS

These, and other aspects, features and advantages of the present invention will be described or become apparent from the following detailed description of the preferred embodiments, which is to be read in connection with the accompanying drawings.

In the drawings, wherein like reference numerals denote similar elements throughout the views.

Figure 1:
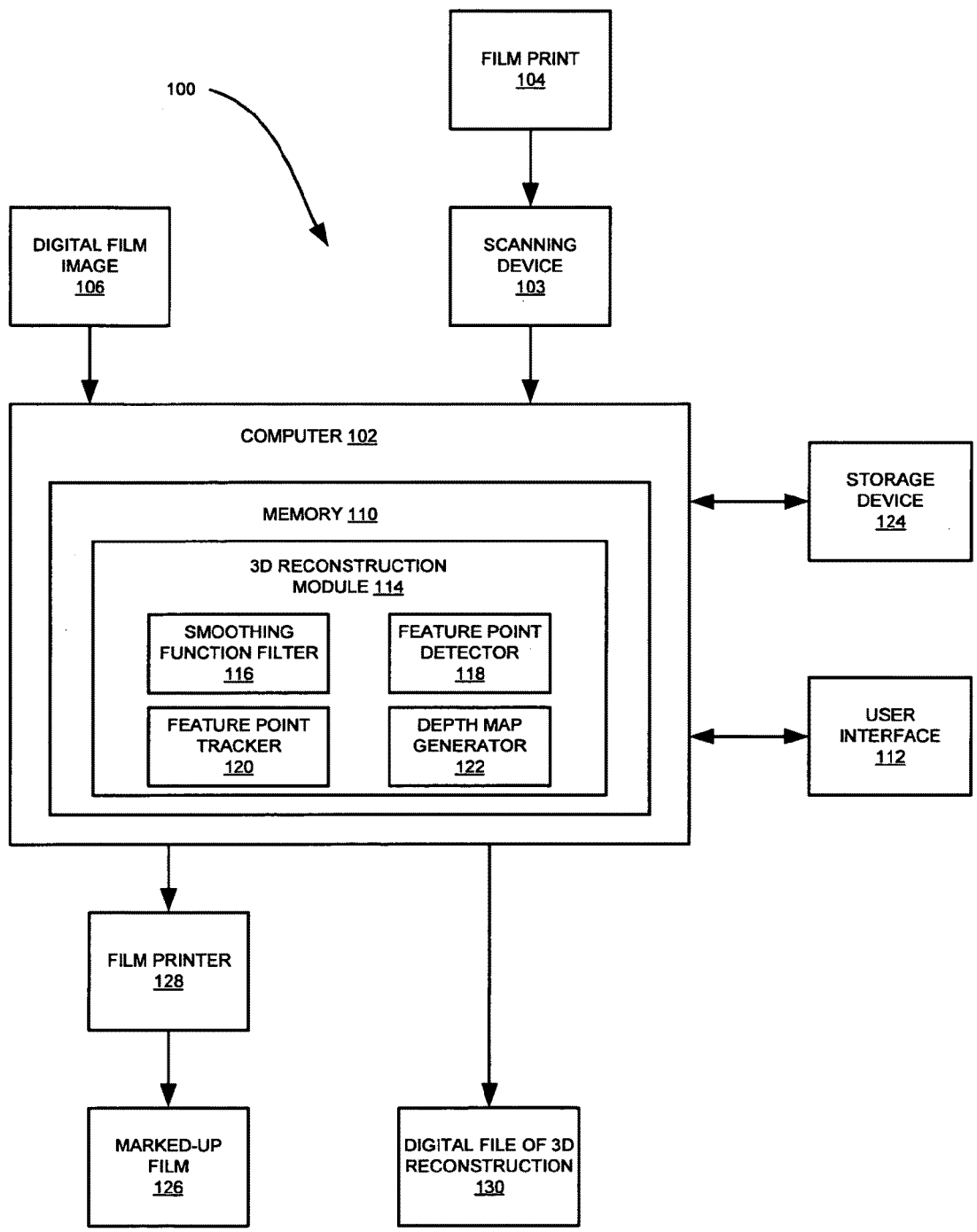
FIG. 1 is an exemplary illustration of a system for three-dimensional (3D) information acquisition according to an aspect of the present invention.

It should be understood that the drawing(s) is for purposes of illustrating the concepts of the invention and is not necessarily the only possible configuration for illustrating the invention.

DETAILED DESCRIPTION OF PREFERRED EMBODIMENTS

It should be understood that the elements shown in the Figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventors to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The techniques disclosed in the present invention deal with the problem of recovering 3D geometries of objects and scenes. Recovering the geometry of a real-world scene is a challenging problem due to the movement of subjects, large depth discontinuity between foreground and background, and complicated lighting and brightness conditions. The current methods used in the feature point selection and tracking to estimate a depth map of an image or to reconstruct the 3D representation do not perform very well by themselves. The reconstruction of 3D images from 2D images is used but the results are limited and the depth map is not very accurate. Some of the techniques for accurate 3D acquisition, such as laser scan, are unacceptable in many situations due to, for example, the presence of human subjects.

A system and method is provided for recovering three-dimensional (3D) geometries of objects and scenes. The system and method of the present invention provides an enhancement approach for Structure From Motion (SFM) using a hybrid approach to recover 3D features. This technique is motivated by the lack of a single method capable of locating features for large environments reliably. The techniques of the present invention start by applying first a different smoothing function, such as Poison or Laplacian transform, to the images before feature point detection/selection and tracking. This type of smoothing filter helps make the features in images more visible to detect than the Gaussian function commonly used. Then, multiple feature detectors are applied to one image to obtain good features. After the use of two feature detectors, good features are obtained, which are then tracked easily throughout several images using a tracking method.

Referring now to the Figures, exemplary system components according to an embodiment of the present disclosure are shown in FIG. 1. A scanning device 103 may be provided for scanning film prints 104, e.g., camera-original film negatives, into a digital format, e.g. Cineon-format or Society of Motion Picture and Television Engineers (SMPTE) Digital Picture Exchange (DPX) files.

The scanning device 103 may comprise, e.g., a telecine or any device that will generate a video output from film such as, e.g., an Arri LocPrO™ with video output. Alternatively, files from the post production process or digital cinema 106 (e.g., files already in computer-readable form) can be used directly. Potential sources of computer-readable files are AVID™ editors, DPX files, D5 tapes etc.

Scanned film prints are input to the post-processing device 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In one embodiment, the software application program is tangibly embodied on a program storage device, which may be uploaded to and executed by any suitable machine such as post-processing device 102. In addition, various other peripheral devices may be connected to the computer platform by various interfaces and bus structures, such a parallel port, serial port or universal serial bus (USB). Other peripheral devices may include additional storage devices 124 and a printer 128. The printer 128 may be employed for printed a revised version of the film 126 wherein scenes may have been altered or replaced using 3D modeled objects as a result of the techniques described below.

Alternatively, files/film prints already in computer-readable form 106 (e.g., digital cinema, which for example, may be stored on external hard drive 124) may be directly input into the computer 102. Note that the term "film" used herein may refer to either film prints or digital cinema.

A software program includes a three-dimensional (3D) reconstruction module 114 stored in the memory 110. The 3D reconstruction module 114 includes a smoothing function filter 116 for making features of objects in images more visible to detect. The 3D reconstruction module 114 also includes a feature point detector 118 for detecting feature points in an image. The feature point detector 118 will include at least two different feature point detection functions, e.g., algorithms, for detecting or selecting feature points. A feature point tracker 120 is provided for tracking selected feature points throughout a plurality of consecutive images via a tracking function or algorithm. A depth map generator 122 is also provided for generating a depth map from the tracked feature points.

Figure 2:
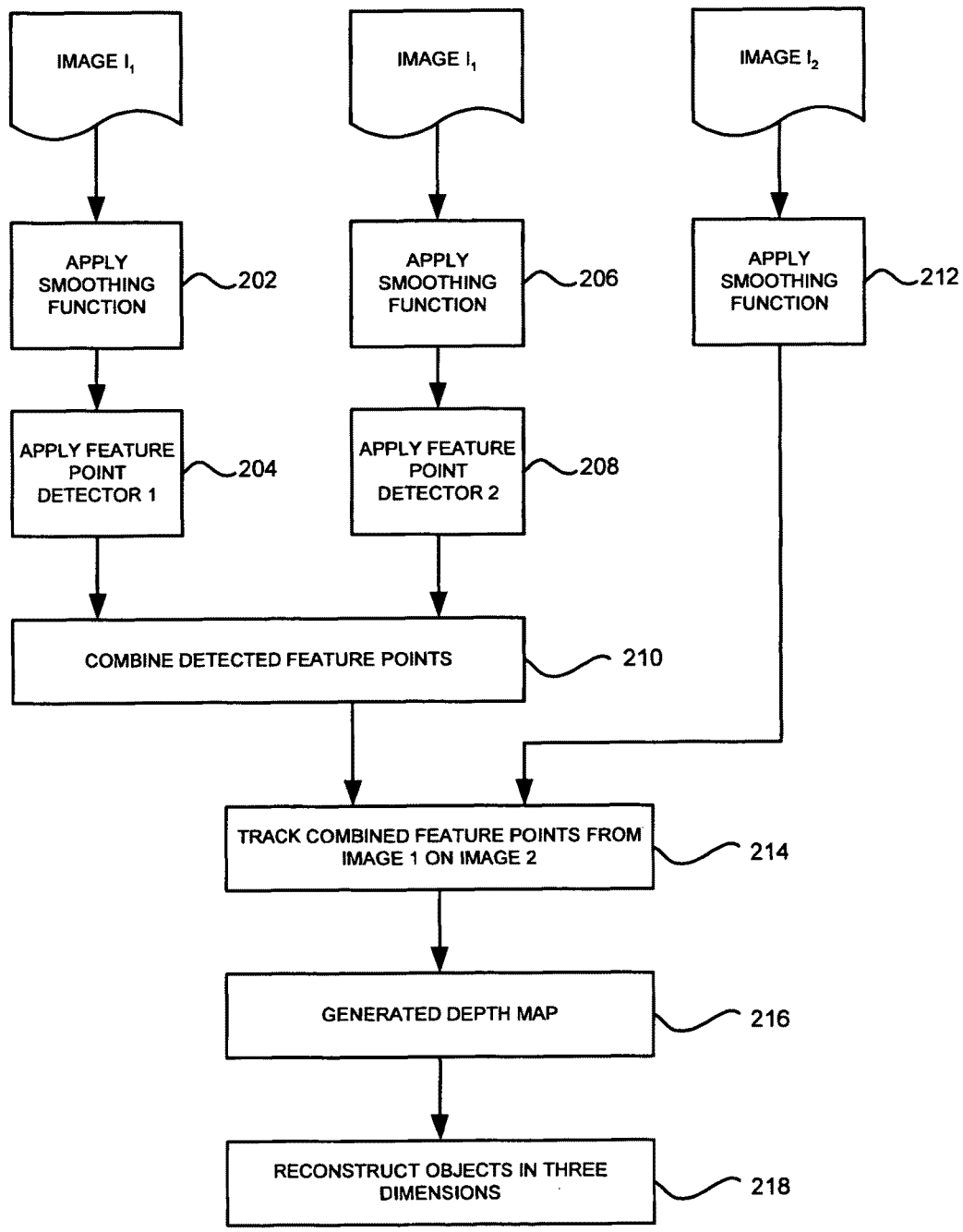
FIG. 2 is a flow diagram of an exemplary method for reconstructing three-dimensional (3D) objects from two-dimensional (2D) images according to an aspect of the present invention.

FIG. 2 is a flow diagram of an exemplary method for reconstructing three-dimensional (3D) objects from two-dimensional (2D) images according to an aspect of the present invention.

Referring to FIG. 2, initially, the post-processing device 102 obtains the digital master video file in a computer-readable format. The digital video file may be acquired by capturing a temporal sequence of video images with a digital video camera. Alternatively, the video sequence may be captured by a conventional film-type camera. In this scenario, the film is scanned via scanning device 103 and the process proceeds to step 202. The camera will acquire 2D images while moving either the object in a scene or the camera. The camera will acquire multiple viewpoints of the scene.

It is to be appreciated that whether the film is scanned or already in digital format, the digital file of the film will include indications or information on locations of the frames (e.g. timecode, frame number, time from start of the film, etc.). Each frame of the digital video file will include one image, e.g., $I_1, I_2, \ldots I_n$.

In step 202, a smoothing function filter 116 is applied to image $I_1$. Preferably, the smoothing function filter 116 is a Poison or Laplacian transform which helps make features of objects in the image more visible to detect than the Gaussian function commonly used in the art. It is to be appreciated that other smoothing function filters may be employed.

Image $I_1$ is then processed by a first feature point detector in step 204. Feature points are the salient features of an image, such as corners, edges, lines or the like, where there is a high amount of image intensity contrast. The feature points are selected because they are easily identifiable and may be tracked robustly. The feature point detector 118 may use a Kitchen-Rosenfeld corner detection operator C, as is well known in the art. This operator is used to evaluate the degree of "cornerness" of the image at a given pixel location. "Corners" are generally image features characterized by the intersection of two directions of image intensity gradient maxima, for example at a 90 degree angle. To extract feature points, the Kitchen-Rosenfeld operator is applied at each valid pixel position of image $I_1$. The higher the value of the operator C at a particular pixel, the higher its degree of "cornerness", and the pixel position (x,y) in image $I_1$ is a feature point if C at (x,y) is greater than at other pixel positions in a neighborhood around (x,y). The neighborhood may be a 5×5 matrix centered on the pixel position (x,y). To assure robustness, the selected feature points may have a degree of cornerness greater than a threshold, such as $T_c=10$. The output from the feature point detector 118 is a set of feature points $\{F_1\}$ in image $I_1$ where each $F_1$ corresponds to a "feature" pixel position in image $I_1$. Many other feature point detectors can be employed including, but not limited to, Scale Invariant Feature Transform (SIFT), Smallest Univalue Segment Assimilating Nucleus (SUSAN), Hough transform, Sobel edge operator and Canny edge detector.

In step 206, image $I_1$ is input to smoothing function filter 116 and a second different feature point detector is applied to the image (step 208). The feature points that are detected in steps 204 and step 208 are then combined and the duplicate selected feature points are eliminated (step 210). It is to be appreciated that the smoothing function filter applied at step 206 is the same filter applied at step 202; however, in other embodiments, different smoothing function filters may be used in each of steps 202 and 206.

Figure 3A:
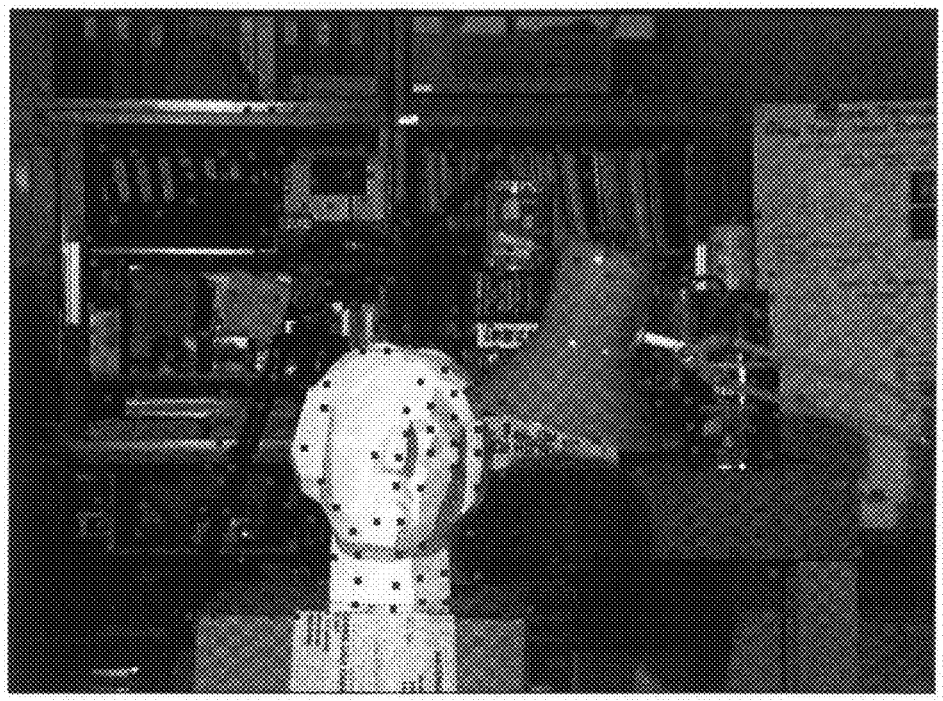
FIG. 3A is an illustration of a scene processed with one feature point detection function.
Figure 3B:
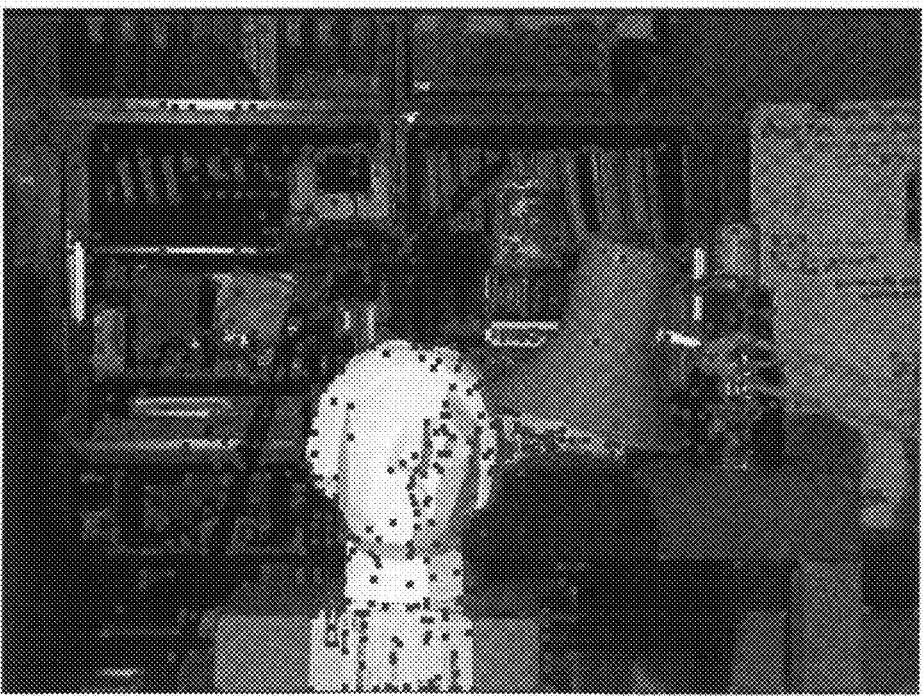
FIG. 3B is an illustration of the scene shown in FIG. 3A processed with a hybrid detection function.

It is to be appreciated that by employing a hybrid approach to feature point detection a large number of feature points will be detected. FIG. 3A illustrates a scene with detected feature points represented by small squares. The scene in FIG. 3A was processed with one feature point detector. In contrast, the scene in FIG. 3B was processed with a hybrid point detector approach in accordance with the present invention and has detected a significantly higher number of feature points.

After the detected feature points are chosen, a second image $I_2$ is smoothed using the same smoothing function filter that was used on the first image $I_1$ (step 212). The good feature points that were selected on the first image $I_1$ are then tracked on the second image $I_2$ (step 214). Given a set of feature points F1 in image $I_1$, the feature point tracker 120 tracks the feature points into the next image $I_2$ of the scene shot by finding their closest match.

As described above, in other embodiments, the smoothing function filter applied in step 212 may be different than the filters applied in steps 202 and 206. Furthermore, it is to be appreciated that although steps 202 through steps 212 were described sequentially, in certain embodiments, the smoothing function filters may be applied simultaneously via parallel processing or hardware.

Once the feature points are tracked, the disparity information is calculated for each tracked feature. Disparity is calculated as the difference between the pixel location in $I_1$ and $I_2$ in the horizontal direction.

Disparity is inversely related to depth with a scaling factor related to camera calibration parameters. At step 216, camera calibration parameters are obtained and are employed by the depth map generator 122 to generator a depth map for the object or scene between the two images. The camera parameters include but are not limited to the focal length of the camera and the distance between the two camera shots. The camera parameters may be manually entered into the system 100 via user interface 112 or estimated from camera calibration algorithms. Using the camera parameters, the depth is estimated at the feature points. The resulting depth map is sparse with depth values only at the detected feature. A depth map is a two-dimension array of values for mathematically representing a surface in space, where the rows and columns of the array correspond to the x and y location information of the surface; and the array elements are depth or distance readings to the surface from a given point or camera location. A depth map can be viewed as a grey scale image of an object, with the depth information replacing the intensity information, or pixels, at each point on the surface of the object. Accordingly, surface points are also referred to as pixels within the technology of 3D graphical construction, and the two terms will be used interchangeably within this disclosure. Since disparity information is inversely proportional to depth multiplied by a scaling factor, it can be used directly for building the 3D scene model for most applications. This simplifies the computation since it makes computation of camera parameters unnecessary.

From the sets of feature points present in the image pair $I_1$ and $I_2$ and an estimate of the depth at each feature point, and assuming that the feature points are chosen so that they lie relatively close to each other and span the whole image, the depth map generator 122 creates a 3D mesh structure by interconnecting such feature points in which the feature points lie at the vertices of formed polygons. The closer the feature points are to each other, the denser the resulting 3D mesh structure.

Since the depth at each vertex of the 3D structure is known, the depths at the points within each polygon may be estimated. In this way the depth at all image pixel positions may be estimated. This may be done by planar interpolation.

A robust and fast method of generating the 3D mesh structure is Delaunay triangulation. The feature points are connected to form a set of triangles whose vertices lie at feature point positions. Using the depth associated with each feature point and its corresponding vertex, a "depth plane" may be fitted to each individual triangle from which the depths of every point within the triangle may be determined.

A complete 3D model of the object can be reconstructed by combining the triangulation mesh resulted from the Delaunay algorithm with the texture information from image $I_1$ (step 218). The texture information is the 2D intensity image. The complete 3D model will include depth and intensity values at image pixels. The resulting combined image can be visualized using conventional visualization tools such as the ScanAlyze software developed at Stanford University of Stanford, Calif.

The reconstructed 3D model of a particular object or scene may then be rendered for viewing on a display device or saved in a digital file 130 separate from the file containing the images. The digital file of 3D reconstruction 130 may be stored in storage device 124 for later retrieval, e.g., during an editing stage of the film where a modeled object may be inserted into a scene where the object was not previously present.

The system and method of the present invention utilizes multiple feature point detectors and combines the results of the multiple feature point detectors to improve the number and quality of the detected feature points. In contrast to a single feature detector, combining different feature point detectors improve the results of finding good feature points to track. After getting the "better" results from the multiple feature point detectors (i.e. using more than one feature point detector), the feature points in the second image are easier to track and produce better depth map results compared to using one feature detector to get the depth map results.

Although the embodiment which incorporates the teachings of the present invention has been shown and described in detail herein, those skilled in the art can readily devise many other varied embodiments that still incorporate these teachings. Having described preferred embodiments for a system and method for three-dimensional (3D) acquisition and modeling of a scene (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A three-dimensional acquisition process comprising:
acquiring first and second images of a scene;
applying at least two feature detection functions to the first image to detect feature points of objects in the first image;
combining outputs of the at least two feature detection functions to select object feature points to be tracked;
applying a tracking function on the second image to track the selected object feature points; and
reconstructing a three-dimensional model of the scene from an output of the tracking function.

2. The three-dimensional acquisition process as in claim 1, further comprising applying a smoothing function on the first image before the applying at least two feature detection functions step to make the feature points of objects in the first image more visible.

3. The three-dimensional acquisition process as in claim 2, wherein the features points are corners, edges or lines of objects in the image.

4. The three-dimensional acquisition process as in claim 2, further comprising applying the same smoothing function on the second image before the applying a tracking function step.

5. The three-dimensional acquisition process as in claim 1, further comprising applying a first smoothing function to the first image before applying a first of the at least two feature detection functions and applying a second smoothing function to the first image before applying a second of the at least two feature detection functions, the first and second smoothing functions make the feature points of objects in the first image more visible.

6. The three-dimensional acquisition process as in claim 1, wherein the combining step further comprises eliminating duplicate feature points detected by the at least two feature detection functions.

7. The three-dimensional acquisition process as in claim 1, wherein the reconstructing step further comprises generating a depth map of the selected object feature points between the first and second images.

8. The three-dimensional acquisition process as in claim 7, wherein the reconstructing step further comprises generating a three-dimensional mesh structure from the selected object feature points and the depth map.

9. The three-dimensional acquisition process as in claim 8, wherein the generating a three-dimensional mesh structure step is performed by a triangulation function.

10. The three-dimensional acquisition process as in claim 8, wherein the reconstructing step further comprises combining the mesh structure with texture information from the first image to complete the three-dimensional model.

11. A system for three-dimensional (3D) information acquisition from two-dimensional (2D) images, the system comprising:
a post-processing device configured for reconstructing a three-dimensional model of a scene from at least two images; the post-processing device including
a feature point detector configured to detect feature points in an image,
the feature point detector including at least two feature detection functions, wherein at least two feature detection functions are applied to a first image of the at least two images;
a feature point tracker configured for tracking selected feature points between at least two images; and
a depth map generator configured to generate a depth map between the at least two images from the tracked feature points;
wherein the post-processing device creates the 3D model from the depth map.

12. The system as in claim 11, wherein the post-processing device further includes a smoothing function filter configured for making feature points of objects in the first image more visible.

13. The system as in claim 12, wherein the smoothing function filter is a Poison transform or Laplacian transform.

14. The system as in claim 12, wherein the feature point detector is configured to combine the detected feature points from the at least two feature detection functions and eliminate duplicate detected feature points.

15. The system as in claim 12, wherein the post-processing device is further configured to generate a three-dimensional mesh structure from the selected feature points and the depth map.

16. The system as in claim 15, wherein the post-processing device is further configured for combining the mesh structure with texture information from the first image to complete the 3D model.

17. The system as in claim 16, further comprising a display device for rendering the 3D model.

18. A non-transitory computer readable medium, tangibly embodying a program of instructions executable by the machine to perform method steps for modeling a three-dimensional (3D) scene from two-dimensional (2D) images, the method comprising:
acquiring first and second images of a scene;
applying a smoothing function to the first image;
applying at least two feature detection functions to the smoothed first image to detect feature points of objects in the first image;
combining outputs of the at least two feature detection functions to select object feature points to be tracked;
applying the smoothing function on the second image;
applying a tracking function on the second image to track the selected object feature points; and
reconstructing a three-dimensional model of the scene from an output of the tracking function.

19. The non-transitory computer readable medium as in claim 18, wherein the reconstructing step further comprises generating a depth map of the selected object feature points between the first and second images.

20. The non-transitory computer readable medium as in claim 19, wherein the reconstructing step further comprises generating a three-dimensional mesh structure from the selected object feature points and the depth map.

21. The non-transitory computer readable medium as in claim 20, wherein the reconstructing step further comprises combining the mesh structure with texture information from the first image to complete the three-dimensional model.

* * * * *